(12) United States Patent
Srinivasan et al.

(10) Patent No.: US 9,965,766 B2
(45) Date of Patent: May 8, 2018

(54) METHOD TO EXPAND SEED KEYWORDS INTO A RELEVANT SOCIAL QUERY

(71) Applicant: ADOBE SYSTEMS INCORPORATED, San Jose, CA (US)

(72) Inventors: Balaji Vasan Srinivasan, Bangalore (IN); Nikhil Mohan Nainani, Mumbai (IN); Tanya Goyal, Chandigarh (IN); Kartik Sreenivasan, Bangalore (IN); Shriram Revankar, Bangalore (IN); David Nicholas Bieselin, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 718 days.

(21) Appl. No.: 14/590,351

(22) Filed: Jan. 6, 2015

(65) Prior Publication Data
US 2016/0196563 A1  Jul. 7, 2016

(51) Int. Cl.
*G06Q 10/00* (2012.01)
*G06Q 30/00* (2012.01)
(Continued)

(52) U.S. Cl.
CPC ... *G06Q 30/0201* (2013.01); *G06F 17/30864* (2013.01); *G06Q 50/01* (2013.01)

(58) Field of Classification Search
CPC .............................................. G06F 17/30864
(Continued)

(56) References Cited

U.S. PATENT DOCUMENTS

| 2011/0225174 A1* | 9/2011 | Artzt | G06Q 30/02 707/750 |
| 2013/0339337 A1* | 12/2013 | Alkhateeb | G06F 17/30864 707/710 |

(Continued)

OTHER PUBLICATIONS

Efron, M. (Jul. 2010). Hashtag retrieval in a microblogging environment. In Proceedings of the 33rd international ACM SIGIR conference on Research and development in information retrieval (pp. 787-788). ACM.

(Continued)

*Primary Examiner* — Sujay Koneru
(74) *Attorney, Agent, or Firm* — Shook, Hardy & Bacon L.L.P.

(57) ABSTRACT

The collection of social data from social networking services for market research purposes is improved by automating the formulation of a final query rule sets by analyzing relevant keywords captured using a seed query rule set based on a user input. Relevant keywords from social mentions based on a seed query rule set for a brand name and/or product can be extracted to form at least parts of a final query rule set. The relevant keywords can then be disambiguated by using a searchable reference to resolve ambiguities. Any generalities in the relevant keywords can also be resolved by analyzing the co-occurrence of the relevant keywords with relevant keywords from another brand and/or product. The relevant keywords having been disambiguated and having generalities resolved therein, may be used to automatically generate a final query rule set for providing relevant search results based on the user input.

10 Claims, 4 Drawing Sheets

(51) Int. Cl.
*G06Q 30/02* (2012.01)
*G06F 17/30* (2006.01)
*G06Q 50/00* (2012.01)

(58) Field of Classification Search
USPC ........................................................ 705/7.29
See application file for complete search history.

(56) References Cited

U.S. PATENT DOCUMENTS

| | | | |
|---|---|---|---|
| 2014/0068515 A1* | 3/2014 | Atacik | G06F 3/0482 715/810 |
| 2015/0254714 A1* | 9/2015 | Zhuang | G06Q 30/0256 705/14.54 |
| 2015/0286708 A1* | 10/2015 | Tao | G06F 17/30675 707/730 |
| 2016/0055490 A1* | 2/2016 | Keren | G06Q 30/00 705/14.47 |
| 2016/0085869 A1* | 3/2016 | Magdy | G06F 17/30867 707/740 |

OTHER PUBLICATIONS

Gong, Z., Cheang, C. W., & Hou, U. L (Aug. 2005). Web query expansion by WordNet. In International Conference on Database and Expert Systems Applications (pp. 166-175). Springer, Berlin, Heidelberg.

Kwok, K. L., Grunfeld, L., & Deng, R (Oct. 2005). Improving weak ad-hoc retrieval by web assistance and data fusion. In Asia Information Retrieval Symposium (pp. 17-30). Springer, Berlin, Heidelberg.

* cited by examiner

METHOD TO EXPAND SEED KEYWORDS INTO A RELEVANT SOCIAL QUERY

BACKGROUND

Social networking platforms have become an increasingly popular medium for consumers to share their opinions on products and/or services. Social network services allow users to easily connect with friends, family members, and the public to share, among other things, satisfaction or dissatisfaction with current products and services, wish lists for upcoming product features and services, comparisons between product and service offerings, and the like. As social networking has continued to grow, companies have recognized value in the technology. For instance, companies have found that social networking provides a great tool for gathering marketing research data. While many companies can create their own social networking profiles for communicating with consumers via social networking posts and other messages, these such companies can also mine social data on social media platforms and forums all around the world wide web to identify what consumers are saying about the company, its products, services, and industry in general.

In order for companies to find social networking posts relevant to their search, a rather complex query must be constructed to extract posts of relevance while filtering out irrelevant "noise." The unstructured nature of social networking data, however, introduces a number of challenges for these companies when constructing queries, particularly because traditional search terms are generally insufficient for filtering out the noise. For instance, the 140 character limit on Twitter often encourages social media users to use grammatically incorrect or informal language. In order to appropriately construct a query capable of listening to relevant content, while taking into account the regularly varying informalities, companies must laboriously construct extremely large queries capable of extracting social networking content which may still fall short of desired relevance.

SUMMARY

This summary is provided to introduce a selection of concepts in a simplified form that are further described below in the Detailed Description. This summary is not intended to identify key features or essential features of the claimed subject matter, nor should it be used as an aid in determining the scope of the claimed subject matter.

Embodiments of the present invention are directed to significantly reducing efforts in constructing query rule sets by a process in which query rule sets are generated by "expanding" seed query rule sets. The process of "expanding" seed query rule sets for retrieving relevant social media posts associated with a brand or product for marketing research purposes is fully automated, thereby addressing the problems introduced by the unstructured nature of social media, more particularly, drastically reducing efforts required to construct relevant query rule sets. In other words, complex final query rule sets are automatically generated based on user-provided seed queries. A search on social posts using a seed query rule set associated with a brand name and/or product is conducted to generate a plurality of seed social mentions. A first plurality of relevant keywords are extracted from the seed social mentions to form at least parts of a final query rule set. The relevant keywords are actual terms from actual social mentions, and therefore may include recurring informalities and grammatical errors. Using such keywords to generate a final query rule set thereby addresses the unstructured nature of social network data. At least some of the first plurality of relevant keywords is analyzed to detect and resolve ambiguities. The first plurality of relevant keywords are compared to another plurality of relevant keywords associated with another brand name and/or product to identify co-occurrences and resolve generalities based on distributions of the co-occurrences. The first plurality of relevant keywords, after having ambiguities and generalities therein resolved, can be used to generate the final query rule set. The final query rule set can then be used to retrieve social mentions that are used for moderation purposes and the like. The final social mentions derived from the final query rule set are more relevant to what the company or marketer is seeking.

BRIEF DESCRIPTION OF THE DRAWINGS

The present invention is described in detail below with reference to the attached drawing figures, wherein.

DETAILED DESCRIPTION

Figure 1:
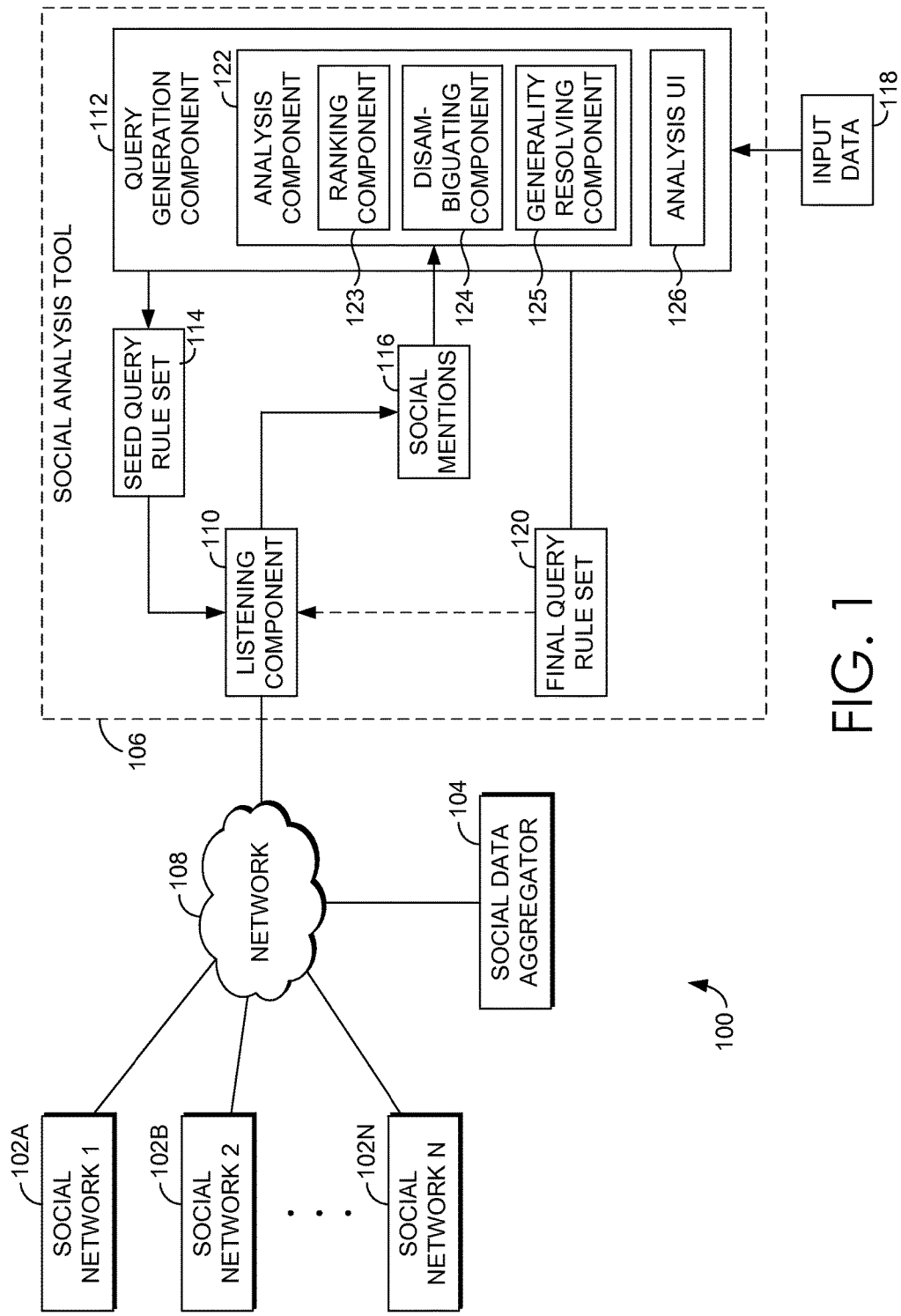
FIG. 1 is a block diagram of an exemplary system architecture in which embodiments of the invention may be employed.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

The terms "social networking service" and "social networking site" refer to any online presence at which a user may share comments with other users within a social network. For instance, this may include services, such as the TWITTER, FACEBOOK, LINKEDIN, TUMBLR, QUORA, and YOUTUBE services, to name a few.

A "social analysis tool" refers to software that facilitates companies' analysis of social networks. Among other things, a social analysis tool may be used by a company to collect information from social networking services and to manage social content and messages using social network services.

A "query" refers to a search performed on social data from social networking services. A query can limit results from the search using keywords or entities comprised of formal or informal text, phrases, hashtags, and/or metadata. Additional conditions or criteria can be added to the query to limit hits and provide more relevant results.

A "query condition" refers to search criteria, such as text, phrases, hashtags, and/or metadata, used to limit social data search results from social networking services. A query condition may include one or more search terms and/or phrases and use standard Boolean formulation to limit hits and provide results more relevant to the query.

A "seed query" or "seed query rule set" refers to a first query comprised of a small subset of search conditions. Generally speaking, a seed query is a low precision search and returns many irrelevant results, herein also referred to as "seed social mentions." For example, if a marketer wanted to perform a simple social media query on a company's product, for instance "Adobe Photoshop", the seed query may look something like "adobe OR photoshop".

A "query rule set" refers to a collection of query conditions. Ideally, an optimal query filtering out irrelevant search results is performed using a "final query rule set." Generally speaking, the final query rule set returns mostly or only relevant results, herein also referred to as "final social mentions." The query rule set can be further optimized by modifying at least one of several query conditions comprised therein.

A "social mention" includes any social networking message that matches the criteria set forth by one or more query conditions. A social mention may include both the text of a social networking message and/or metadata associated with the message.

A "query expansion" refers to a reformulation of a seed query to improve retrieval performance and accuracy in information retrieval operations. Improved retrieval performance can be synonymous to improving relevance in search results. In some instances, a query expansion can refer to the formulation of a new, final query rule set based off of the seed query rule set.

A "moderator" is a person who is responsible for reviewing social mentions for a company and deciding whether to take moderation actions on certain social mentions. For instance, a moderator can be a marketer conducting marketing research for the company. In other instances, the moderator can be a person in charge of administering social media interactions between the company and its consumers.

Social media provides companies and market researchers with copious amount of unstructured and oftentimes grammatically incorrect social and marketing data from which to conduct market research. To assist companies in their social networking research, some analysis tools, such as the ADOBE SOCIAL tool, have been developed that provide mechanisms for companies to collect information regarding what consumers are saying about their products, their brand, and even competitor brands and products. These social analysis tools allow companies to set rules for capturing and analyzing social data from social networks. The social data may be provided by a listening component that captures a plurality of social mentions, which each include keywords of particular interest or meet query conditions. A person (e.g., a marketer) faces a major challenge of formulating a query that is exhaustive enough to weed out irrelevant social networking mentions and also account for the unstructured nature of social media content, For example, given the 140 character limit on Twitter, a large number of social mentions can be grammatically incorrect and use informal language. To account for the potentially high number of informally structured, nevertheless relevant posts, query formulation may require laborious efforts in accounting for the many potentially relevant variations of informal communications. As such, query formulation can be very time consuming and search results are often too broad.

Embodiments of the present invention are generally directed to significantly reducing efforts in query construction (herein also referred to as "query expansion"). The process of expanding seed query rule sets for retrieving relevant social mentions associated with a brand name or product for marketing research purposes can be fully automated, thereby reducing the laborious efforts of query construction, especially in light of informal social media environments. In other words, final query rule sets can be automatically constructed when provided with a seed query rule set, typically provided by a user. Automation of query reformulation can save the marketer from the tedious efforts of reformulating a relevant query based off of a seed query rule set. Generally, social media search results generated from a seed query rule set results in an initial set of social mentions. For instance, the seed query rule set may include search terms related to the product and/or brand name for which the query is being expanded. Based on keywords extracted from the initial search results derived from the seed query rule set, the goal is to further expand the seed query rule set and automatically add and/or modify conditions, using the extracted keywords, to generate a more relevant final query rule set. The keywords from the social mentions are analyzed and the seed query rule set is reformulated based on whether the keywords are ambiguous and/or generic. The reformulation of the seed query rule set is, in other words, the generation of a final query rule set. Because the final query rule set is generated based on keywords that are actual words found in actual social mentions posted by users, the final query rule set is better suited to account for the unstructured nature of social data, including grammatically incorrect and informal language. The final query rule set can be used to filter out irrelevant social mentions from the social networking services, thereby resulting in relevant social mentions for moderation purposes and the like. It is well within the scope of the invention to consider that the keywords extracted from social mentions generated from the seed query rule set can be analyzed using various techniques not mentioned herein to further expand the query.

Turning now to FIG. 1, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 may include a number of social networking services 102A, 102B, 102N, a social data aggregator 104, and a social analysis tool 106. It should be understood that the system 100 shown in FIG. 1 is an example of one suitable computing system architecture. Each of the components shown in FIG. 1 may be implemented via any type of computing device, such as computing device 100 described with reference to FIG. 1, for example. The components may communicate with each other via a network 108, which may include, without limitation, one or more local area networks (LANs) and/or wide area networks (WANs). Such networking environments are commonplace in offices, enterprise-wide computer networks, intranets, and the Internet. It should be understood that any number of social networking services, social data aggregators, and social analysis tools may be employed within the system 100 within the scope of the present invention. Each may comprise a single device or multiple devices cooperating in a distributed environment. For instance, the social analysis tool 106 may be provided via multiple devices arranged in a distributed environment that collectively provide the functionality described herein. Additionally, other components not shown may also be included within the network environment.

The social analysis tool 106 may be employed by a company to assist in managing the company's brand. Among other things, the social analysis tool 106 operates to collect social data from social networking services 102A, 102B, 102N. As represented in FIG. 1, social data may be collected from any number of social networking services. These services generally include any online presence at which users may share messages with other users within a social network of users. In some instances, the social analysis tool 106 may access social data directly from a social networking service or an entity providing the social analysis tool 106 may access the data from a social networking service and provide the data to the tool 106. For instance, a social networking service may provide APIs that expose the data. In other instances, the social analysis tool 106 may access social data from a third-party social data aggregator 104 (e.g., the GNIP service), which may operate to access data from one or more social networking services, standardize the data, and provide the standardized data. Any and all such variations are contemplated to be within the scope of embodiments of the present invention.

As shown in FIG. 1, the social analysis tool 106 includes, among other things not shown, a listening component 110 and a query generation component 112. The listening component 110 is generally provided with a seed query rule set 114, generated by the query generation component 122, including one or more query conditions that set forth criteria used by the listening component 110 to identify particular social mentions for capture from the social data. The seed query rule set 114 may include any number of query conditions. In some instances, the seed query rule set 114 may provide very few query conditions for capturing a broad scope of social mentions. In other instances, the seed query rule set 114 may provide multiple query conditions for further narrowing the scope of captured social mentions.

The query generation component 112 can be configured to generate both a seed query rule set 114 and a final query rule set 120. In more detail, the query generation component 112 can receive input data 118 from an administrator used to generate the seed query rule set 114. The input data 118 may include one or more seed keywords, such as a brand name, products associated therewith, and/or competitors of the brand. When in receipt of the input data 118, the query generation component 112 may generate the seed query rule set 114 based on the input data 118. For instance, if an administrator input seed keywords "Adobe", "Photoshop", and "Example Competitor Name", an exemplary query rule set generated by the query generation component 112 may appear similar to: Adobe OR Photoshop OR "Example Competitor Name". As can be appreciated by one of ordinary skill in the art, Boolean operators (e.g., OR, AND, NOT, etc.) may be utilized to construct the seed query rule set 114. Generally, any aspect of social messages that may be of interest to a company may be provided as seed keywords in the input data 118. The criteria may include specific terms or phrases included within social messages. For example, the terms may include the company's trademarks or terms relevant to the company's products, services, industry, or otherwise of interest to the company. The terms may be bare terms or may be terms associated with a hashtag or other term tagging mechanism employed by users. Any number of terms or phases may be included in the input data 118. However, in a preferred embodiment, at least one of the terms would include a name of the company's competitor, as will be further described herein.

The listening component 110 applies the query conditions of the seed query rule set 114 to social data accessed from social networking services 102A, 102B, 102N and/or the social data aggregator 104 to identify social mentions 116 that satisfy the criteria set forth by the collective query conditions within the seed query rule set 114. The social mentions 116 captured by the listening component 110 can then be analyzed by the analysis component 122 for reformulation or expansion of the seed query rule set, and the subsequent generation of the final query rule set 120. As described with regard to the application of query conditions defined by the seed query rule set 114, the listening component 110 can also apply the query conditions of the final query rule set 120 to identify social mentions 116 that satisfy the criteria set forth by the collective query conditions within the final query rule set 120.

The query generation component 112 operates to generate, in addition to a seed query rule set 114, a final query rule set 120. The query generation component 112 can analyze social mentions derived from the seed query rule set 114 to generate a final query rule set 120 for improved capturing of social mentions likely to be relevant to the company, thereby reducing the overall number of social mentions that need to be potentially reviewed by a moderator. Although the query generation component 112 is shown as part of the social analysis tool 106 in FIG. 1, it should be understood that the query generation component 112 may be provided separate from a social analysis tool (e.g., as a stand-alone application or service) in other embodiments.

As shown in FIG. 1, the query generation component 112 includes an analysis component 122 that analyzes social mentions 116 captured using the seed query rule set 114. The final query rule set 120 may be generated by either modifying the seed query rule set 114 (e.g., by modifying existing query conditions of the seed query rule set 114 adding new query conditions to the seed query rule set 114 and/or removing query conditions from the seed query rule set 114) or replacing the seed query rule set 114 with an entirely new set of query conditions.

The analysis component 122 includes a ranking component 123 that can take search results generated from a seed query rule set 114, extract all keywords associated with the seed query rule set 114, and rank order them as per their relevance to the brand name and/or product. For instance, the keywords associated with, or in other words generated from, the seed query rule set 114, can be extracted from the social mentions 116 if co-occurring with a standard ontology or taxonomy related to the product and/or brand name for which the query is being expanded. The standard ontology or taxonomy is words generally known to be of relevance to the brand name and/or product being searched, also referred to herein as "domain words". In some instances, if an exact ontology is unavailable, a list of products from the brand can also be used as the domain words. Taking results generated from the seed query rule set 114, all keywords or entities co-occurring with the domain words are extracted and ranked according to their frequency of co-occurrence in the generated social mentions. The extracted entities may include entities in hash-word form (e.g., hashtags) and/or standalone terms (e.g., words in tweets). All extracted entities having a co-occurrence index being greater than a defined threshold can be referred to herein as "query words." In some instances, once generated, the query words can be sent to the query generation component 112 to begin expansion of the seed query rule set 114 for formulating the final query rule set 120. In some embodiments, and as can be appreciated by one of ordinary skill in the art, each query word added to the final query rule set 120 by the query generation component 112 can be associated with a Boolean operator OR to construct a final query rule set 120 in a disjunctive normal form.

The analysis component 122 also includes a disambiguating component 124 that can further analyze the keywords associated with the social mentions 116 to identify ambiguous or broadly interpreted query words among them, and modify the keywords accordingly. The analysis component 122 can identify which query words are ambiguous and further determine which query words need to be disambiguated. For instance, if the query words included terms such as "cloud", "office", or "technology", a query including such terms without any additional conditions may result in a noisy data stream and may require disambiguation. As such, the analysis component 122 can eliminate most ambiguities by processing each query word through an electronically searchable reference. For instance, if an online thesaurus includes a reference to a query word, the query word may be considered to be an ambiguous query word, as it can yield numerous results that are irrelevant to a brand name or product. As such, the query word can be flagged as ambiguous for subsequent action. In another example, an online encyclopedia (e.g., Wikipedia) can yield a number of potential search results when provided with a search term based on a query word. If the returned content does not contain the brand name or any of its products, the query word can also be flagged as ambiguous.

In some instances, query words in the form of hash-words can either be substrings of product names or contain the product names therein. For example, the hash-word "#IlovePhotoshop" is relevant to the brand name Adobe and contains the name of the Adobe product "Photoshop." To extract the hash-words, all hash-words that are either substrings of domain words or contain domain words therein can be marked relevant and the remainder can be flagged as ambiguous. To more stringently restrict hash-words from producing a noisy search result, some embodiments can consider only cases where substrings are at the beginning or end of the considered query word.

Further, the disambiguating component 124 can identify the correct form for adding or appending ambiguous query words to the query. When disambiguating ambiguous query words, overly broad and/or unspecific search terms are appropriately narrowed by adding or appending limiting search terms thereto. For instance, each ambiguous word can be added to the query as a highly frequented bigram that it is part of (e.g., "dairy milk" for a query word like "dairy" for brand name "Cadbury's"). In some instances, if the query word is not part of a frequent bigram, the query word can be added to its most frequently co-occurring domain word joined by an "AND" condition and subsequently added to the query (e.g., domain word AND query word). In other instances, the query word can be joined with the brand name using the "AND" condition and subsequently add them both to the query (e.g., query word AND "Adobe"). In some instances, once disambiguated, the query words and any applicable disambiguating conditions can be sent to the query generation component 112 to continue formulation of the final query rule set 120 For instance, each query word or query word with a conditional "AND" and a qualifier or condition can be added to the final query rule set 120 by the query generation component 112, and subsequently associated, using a Boolean operator OR, with the existing query words to obtain the expanded query rule set in the disjunctive normal form.

The analysis component 122 also includes a generality resolving component 125 that can further identify query words that are specific to the brand name and/or its products versus query words that are general and may apply to competitors as well. For instance, one or more competitor company names can be provided by an administrator or marketer in the input data 118. An equal sample of social mentions from the company, along with a sample of social mentions for the one or more competitor companies, are analyzed to determine which keywords are generic to the domain or specific to the brand. In some embodiments, as was performed by the ranking component 123 described above for the brand name and/or product of interest, query words are also independently extracted (e.g., the hash-words and standalone terms) for the competitor companies. The ratio of the co-occurrence of a query word with each brand to its total frequency is referred to as the term's associativity with the brand. As such, all query words having associativity distributions particularly skewed towards a single company are terms determined to be "specific" to that company, while those whose associativity is substantially evenly distributed across the brand and its competitors are terms determined to be "generic." Query words determined to be specific are added directly to the final query rule set 120 through the query generation component 112, whereas generic query words are joined with the brand name using a Boolean AND operator and then subsequently added to the final query rule set 120 through the query generation component 112. Each specific query word or generic query word with an "AND" operator and brand name can be added to the final query rules set 120 by the query generation component 112, and subsequently associated, using a Boolean operator OR, with the existing query words to obtain the expanded query rule set in the disjunctive normal form.

An analysis UI 126 may be provided that presents the final query rule set 120 to a user. This allows the user to review details of the final query rule set 120 and make a determination regarding whether to implement the final query rule set 120. For instance, the analysis UI 126 may provide a control that allows the user to accept the final query rule set 120 for implementation or to reject the final query rule set 120.

In some embodiments, the analysis UI 126 may be configured to allow the user to make manual changes to the final query rule set 120. For instance, the analysis UI 126 may present details of the final query rule set 120, including the various criteria included in the query conditions of the final query rule set 120. The user may view the criteria and make changes if desired. Any changes made by the user may be applied to the final query rule set 120. In some embodiments, the user may choose to implement the final query rule set 120 and generate a new set of social mentions derived therefrom, by sending the final query rule set 120 to the listening component 110 for generating an optimized set of social mentions 116.

Figure 2:
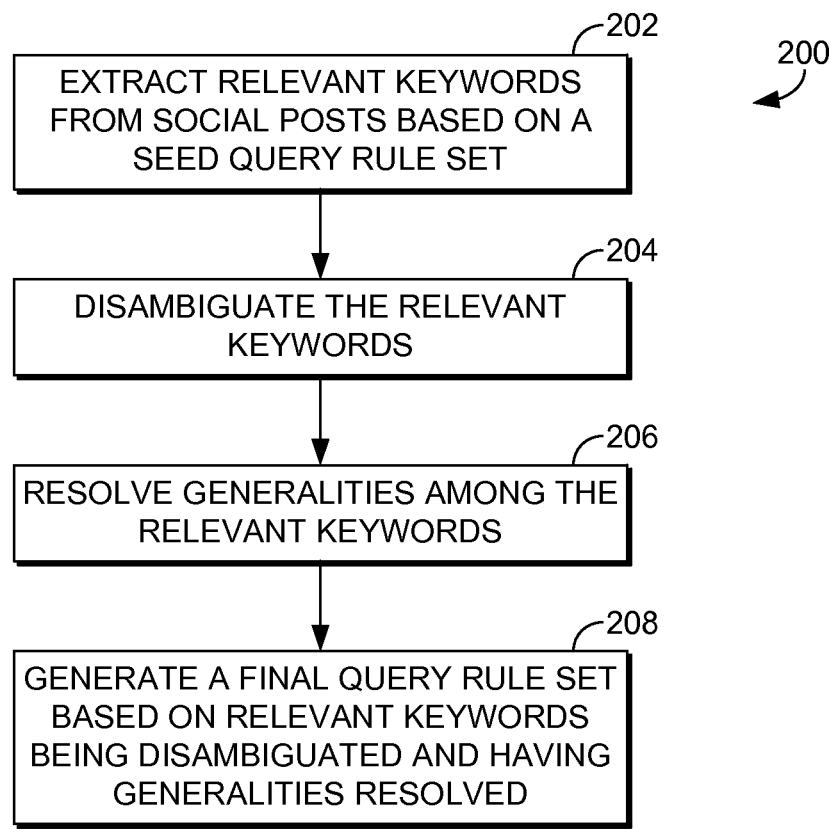
FIG. 2 is a flow diagram showing a method for automatically expanding queries by analyzing relevant keywords captured using an initial query rule set in accordance with an embodiment of the present invention.

Turning now to FIG. 2, a flow diagram is provided that illustrates a method 200 for automatically formulating a final query rule set by analyzing relevant keywords identified in social mentions captured using a seed query rule set based on user input data. Each block of the method 200 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the methods may be provided as part of a social analysis tool, such as the ADOBE SOCIAL tool.

As shown at block 202, relevant keywords are extracted from social mentions (for instance, by the analysis component 122 of FIG. 1) derived from a seed query rule set provided, for instance, to a listening component similar to element 110 of FIG. 1. The seed query rule set can be based on one or more keywords relevant to a brand name, product, and/or competitors of the brand. For instance, the seed query rule set may include the search keywords: "adobe" OR "creative cloud" OR "creative suite". In some embodiments, a seed query rule set can capture a number of social mentions meeting the search query criteria. Keywords in the social mentions are identified, extracted, and analyzed to determine frequency of co-occurrence with the domain words occurring therein, and ranked according to their frequency of co-occurrence to the domain words (for instance, by the ranking component 123). Keywords having a co-occurrence index greater than a defined threshold are retained as query words, as explained above.

The query words are further analyzed, as shown at block 204, to identify ambiguous terms and modify the query word with qualifiers and/or query conditions to resolving ambiguities and reduce irrelevant social noise (for instance, by the disambiguating component 124). Each query word is processed through an electronically searchable reference to determine whether the results of the search yield data that is irrelevant to the brand name and/or product. In the event a query word is determined to be ambiguous, the form in which the query word is added or modified in the query is appropriately determined. For example, depending on the circumstances, the query word can be modified as a highly frequented bigram, joined with its most frequently co-occurring domain word, or joined with the company name. Once disambiguated, each query words is compared to keywords related to one or more competitor's brand name and/or product to determine if the query word is generic, as shown at block 206. The competitor keywords can be provided or similarly generated by the analysis component 122 of FIG. 1. The distribution of co-occurring keywords is analyzed and each of the query words is determined to be specific or generic to the brand name and/or product. As such, specific query words are directly added to the query, whereas generic query words are joined with the brand name, using a Boolean operator such as "AND", prior to inclusion in the query.

A final query rule set is generated, as shown at block 208, using at least the unambiguous query words, disambiguated query words, specific query words, and generic query words ANDed with the brand name. As described above, the final query rule set provides an optimized query rule set for narrowing the scope of social mentions captured using, for instance, the listening component 110 of FIG. 1. The final query rule set reformulates the seed query rule set to provide social mentions that are more relevant to the input data provided by the user.

Figure 3:
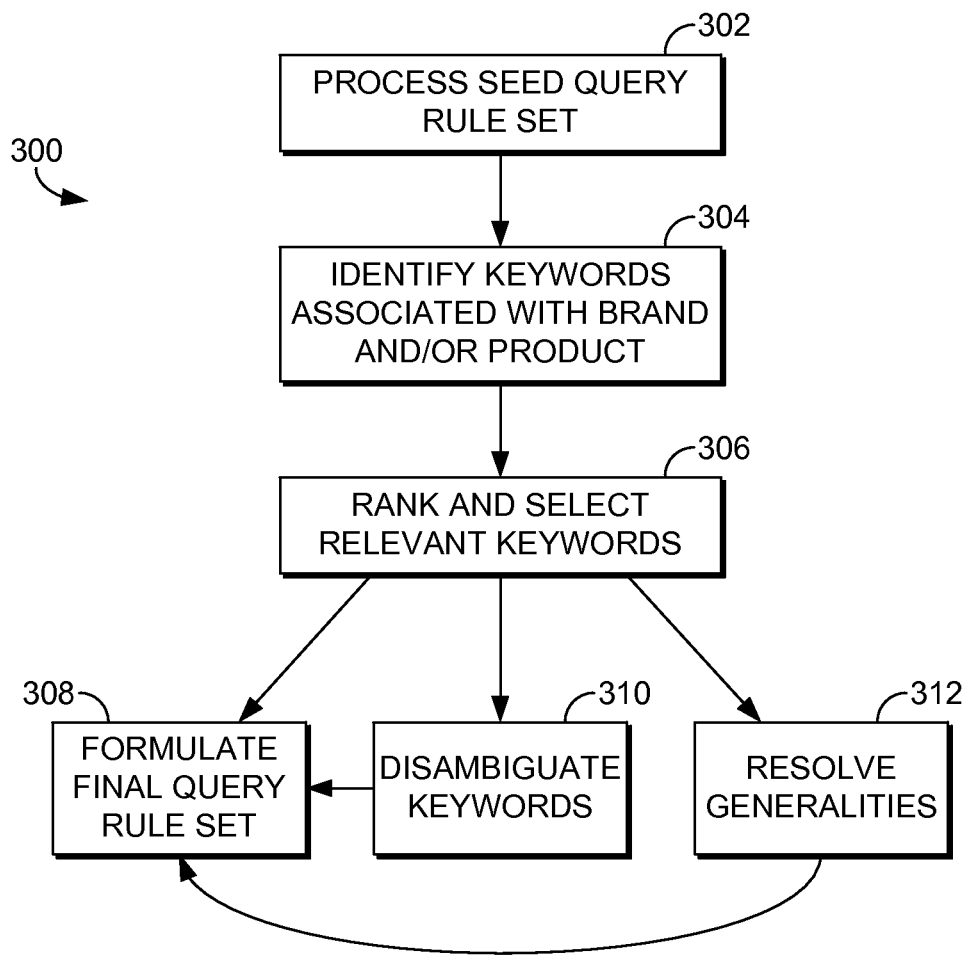
FIG. 3 is a flow diagram showing a method for automatically expanding queries by analyzing relevant keywords captured using an initial query rule set in accordance with an embodiment of the present invention.

Turning now to FIG. 3, a flow diagram is provided that illustrates a method 300 for automatically formulating a final query rule set by analyzing relevant keywords captured using an seed query rule set based on input data. Initially, as shown at block 302, a seed query rule set is processed by a listening component (for instance, the listening component 110 of FIG. 1) to produce social mentions captured by search conditions of the seed query rule set. Results derived from the seed query rule set are analyzed by, for instance, the analysis component 122 of FIG. 1. The results are analyzed, as shown at block 304, to identify keywords within the social mentions associated with a standard ontology or taxonomy related to the product and/or brand name. The keywords are subsequently ranked and selected, as shown in block 306, based at least on a standard deviation threshold. The selected keywords are processed, by the query generation component 112, to expand the seed query rule set based on the selected keywords and formulate a final query rule set, as shown at block 308.

In some instances, the keywords are subsequently disambiguated, as shown at block 310, to further eliminate irrelevant mentions generated by the query. This may be performed, for instance, by processing each keyword through an electronically searchable reference (e.g., thesaurus or encyclopedia) to determine if the results yield any content relevant to the brand name and/or product. Ambiguous keywords are only added to or modified in the query once joined with one of a highly frequented and associated bigram, joined with a most frequently co-occurring domain word, or joined with the company name. The ambiguous keywords are generally joined with one of the aforementioned disambiguating modifiers using, for instance, the Boolean operator "AND". The disambiguation and determination of how the keyword is added to or modified in the query can be performed by the disambiguation component 124 of FIG. 1.

In some other instances, keyword generalities are resolved, as shown at block 312, to resolve for generic keywords common across the domain. This can be performed, for instance, by comparing keywords generated for a particular brand with keywords generated or provided for the particular brand's competitors. Keywords that are commonly distributed among the brand and its competitors can be determined as generic, whereas keyword distributions skewed towards a single company can be termed as specific. Specific keywords can then be added to the query as-is, while generic keywords must be joined with the brand name prior to adding to or modifying the query. The generality resolution can be performed by the generality resolving component 125 of FIG. 1.

Figure 4:
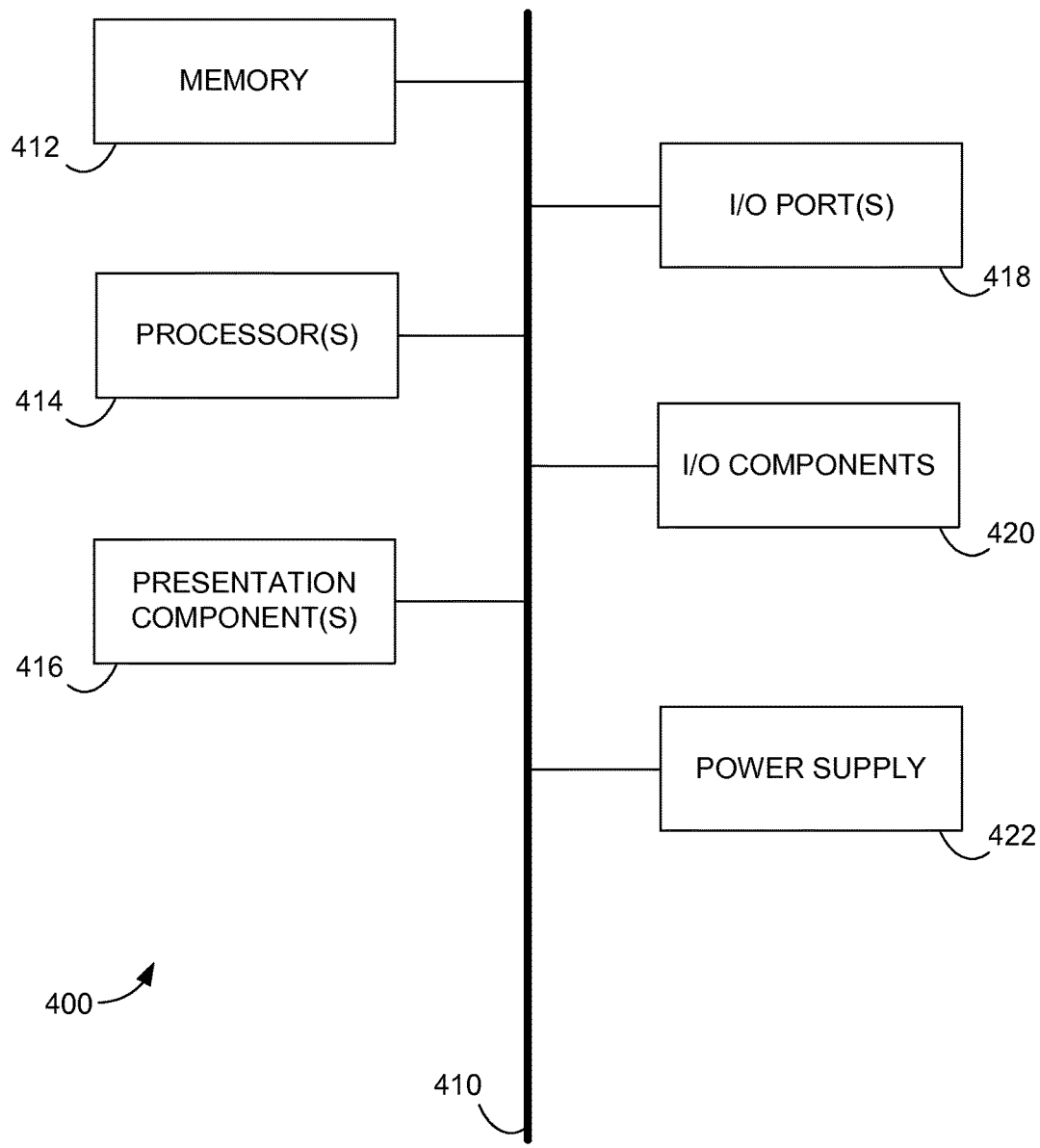
FIG. 4 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 4 in particular, an exemplary operating environment for implementing embodiments of the present invention is shown and designated generally as computing device 400. Computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 4, computing device 400 includes a bus 410 that directly or indirectly couples the following devices: memory 412, one or more processors 414, one or more presentation components 416, input/output (I/O) ports 418, input/output components 420, and an illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 4 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer-storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 400. The computing device 400 may be equipped with depth cameras, such as, stereoscopic camera systems, infrared camera systems, RGB camera systems, and combinations of these for gesture detection and recognition. Additionally, the computing device 400 may be equipped with accelerometers or gyroscopes that enable detection of motion. The output of the accelerometers or gyroscopes may be provided to the display of the computing device 400 to render immersive augmented reality or virtual reality.

As can be understood, embodiments of the present invention provide for, among other things, automatically formulating final query rule sets by analyzing relevant keywords captured using a seed query rule set based on user input data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations comprising:
   identifying, from an obtained plurality of social network posts, a set of seed social mentions that are determined related to a defined brand name or a product thereof, based at least in part on an executed seed query rule set referencing the defined brand name or product;

extracting, from at least a portion of the identified set of seed social mentions, at least a first keyword that is determined included in a defined ontology associated with the defined brand name or product;

determining that the first keyword is one of a generic term or a brand-specific term associated with a competitor brand, wherein the first keyword is determined the generic term based at least in part on a received result of an executed search of the first keyword utilizing at least one of an electronically-accessible thesaurus and an electronically-accessible encyclopedia, and wherein the first keyword is determined the brand-specific term based at least in part on an identified co-occurrence thereof in another defined ontology associated with the competitor brand;

based at least in part on the determination that the first keyword is one of the generic term or the brand-specific term, appending to the first keyword a disambiguating condition that is selected based at least in part on another determination that the first keyword either corresponds to a highly-frequented bi-gram or is included in another defined ontology associated with the competitor brand and is a sub-string of at least the first keyword.

2. The non-transitory computer storage medium of claim 1, wherein the extracted first keyword is one of an extracted plurality of keywords determined included in the defined ontology associated with the defined brand name or product, and wherein the extracted plurality of keywords is ranked based on a frequency of occurrence in the defined ontology.

3. The non-transitory computer storage medium of claim 2, the operations further comprising:

based on the disambiguating condition being appended to the extracted first keyword, determining that an extracted second keyword in the extracted plurality of keywords is one of a different generic term or a different brand-specific term associated with a different competitor brand, to append thereto a different disambiguating condition based on the extracted second keyword being determined to be ranked immediately after the extracted first keyword.

4. The non-transitory computer storage medium of claim 3, wherein the received result includes an output received from at least one of the electronically-accessible thesaurus and the electronically-accessible encyclopedia.

5. The non-transitory computer storage medium of claim 1, wherein the determination that the first keyword is one of the generic term or the brand-specific term is based further in part on a calculated distribution of the first keyword.

6. A computer-implemented method comprising:

extracting a set of keywords from a plurality of social network posts determined related to a defined brand name or a product thereof, wherein the plurality of social network posts is determined related based at least in part on an executed seed query rule set that includes a reference to the defined brand name or product, and wherein the set of keywords is extracted based at least in part on a determination that each keyword of the first set is included in a defined ontology associated with the defined brand name or product; and for each keyword in the extracted set of keywords, and in an order based on a number of times that the keyword is determined included in the plurality of social network posts:

determining that the keyword is one of a generic term, or a brand-specific term that is associated with a competitor brand, wherein the keyword is determined the generic term based at least in part on a received result of an executed search of the keyword utilizing at least one of an electronically-accessible thesaurus and an electronically-accessible encyclopedia, and wherein the keyword is determined the brand-specific term based at least in part on an identified co-occurrence thereof in another defined ontology associated with the competitor brand, and based at least in part on the determination that the keyword is one of the generic term or the brand-specific term, appending to the keyword a disambiguating condition that is selected based at least in part on another determination that the keyword either corresponds to a highly-frequented bi-gram or is included in another defined ontology associated with the competitor brand and is a sub-string of at least the keyword.

7. A computerized system comprising:

one or more processors; and one or more computer storage media storing computer-useable instructions that, when used by the one or more processors, cause the one or more processors to:

extract a set of keywords from a plurality of social network posts determined related to a defined brand name or a product thereof, wherein the plurality of social network posts is determined related to the defined name or product based at least in part on an executed seed query rule set that includes a reference to the defined brand name or product, and wherein the set of keywords is extracted based at least in part on a determination that each keyword in the set of keywords is included in a defined ontology associated with the defined brand name or product; and for at least a first keyword in the extracted set of keywords:

determine that the first keyword is one of a generic term or a brand-specific term associated with a defined competitor brand name or product, wherein the first keyword is determined the generic term based at least in part on a received result of an executed search of the first keyword utilizing at least one of an electronically-accessible thesaurus and an electronically-accessible encyclopedia, and wherein the first keyword is determined the brand-specific term based at least in part on an identified co-occurrence thereof in another defined ontology associated with the defined competitor brand or product, and based at least in part on the determination that the first keyword is one of the generic term or the brand-specific term, append to the first keyword a disambiguating condition that is selected based at least in part on another determination that the first keyword either corresponds to a highly-frequented bi-gram or is included in the other defined ontology associated with the defined competitor brand name or product and is a sub-string of at least the first keyword.

8. The computerized system of claim 7, wherein the disambiguating condition includes the defined competitor brand name or product.

9. The computerized system of claim 8, wherein the disambiguating condition is appended to the first keyword with a Boolean "AND" operator.

10. The computerized system of claim 7, wherein the first keyword is determined associated with the defined competitor brand name or product based further in part on a frequency of the first keyword included in at least a portion of the plurality of social network posts having terms included in the other defined ontology associated with the defined competitor brand name or product.

\* \* \* \* \*